United States Patent
Kutliroff

(10) Patent No.: US 8,113,991 B2
(45) Date of Patent: Feb. 14, 2012

(54) METHOD AND SYSTEM FOR INTERACTIVE FITNESS TRAINING PROGRAM

(75) Inventor: Gershom Kutliroff, Alon Shrut (IL)

(73) Assignee: Omek Interactive, Ltd., Bet Shemesh (IL)

( * ) Notice: Subject to any disclaimer, the term of this patent is extended or adjusted under 35 U.S.C. 154(b) by 84 days.

(21) Appl. No.: 12/392,879

(22) Filed: Feb. 25, 2009

(65) Prior Publication Data

US 2009/0298650 A1 Dec. 3, 2009

Related U.S. Application Data

(60) Provisional application No. 61/058,173, filed on Jun. 2, 2008.

(51) Int. Cl.
- A63B 71/00 (2006.01)
- A61B 5/103 (2006.01)
- A63B 15/02 (2006.01)
- A61B 5/117 (2006.01)

(52) U.S. Cl. ........ 482/8; 482/1; 482/9; 348/77; 600/595

(58) Field of Classification Search ............... 482/1, 8, 482/9; 715/863; 348/46, 51, 77; 273/444; 600/595; 434/257

See application file for complete search history.

(56) References Cited

U.S. PATENT DOCUMENTS

| | | | |
|---|---|---|---|
| 4,900,033 A * | 2/1990 | Campos et al. | 273/249 |
| 5,534,917 A | 7/1996 | MacDougall et al. | |
| 6,181,343 B1 * | 1/2001 | Lyons | 715/850 |
| 6,270,414 B2 * | 8/2001 | Roelofs | 463/36 |
| 6,336,891 B1 * | 1/2002 | Fedrigon et al. | 482/8 |
| 6,632,158 B1 * | 10/2003 | Nashner | 482/8 |
| 6,941,239 B2 * | 9/2005 | Unuma et al. | 702/141 |
| 7,038,855 B2 * | 5/2006 | French et al. | 359/630 |
| 7,340,077 B2 | 3/2008 | Gokturk et al. | |
| 7,379,563 B2 * | 5/2008 | Shamaie | 382/103 |
| 7,421,369 B2 * | 9/2008 | Clarkson | 482/8 |
| 7,753,861 B1 * | 7/2010 | Kahn et al. | 600/595 |
| 7,781,666 B2 * | 8/2010 | Nishitani et al. | 84/723 |
| 7,789,800 B1 * | 9/2010 | Watterson et al. | 482/8 |
| 7,840,031 B2 * | 11/2010 | Albertson et al. | 382/103 |
| 7,843,425 B2 * | 11/2010 | Lu et al. | 345/156 |
| 2001/0016510 A1 * | 8/2001 | Ishikawa et al. | 463/7 |
| 2003/0078138 A1 * | 4/2003 | Toyama | 482/8 |
| 2003/0134714 A1 * | 7/2003 | Oishi et al. | 482/6 |
| 2003/0156756 A1 | 8/2003 | Gokturk et al. | |
| 2004/0001113 A1 | 1/2004 | Zipperer et al. | |

(Continued)

FOREIGN PATENT DOCUMENTS

| | | |
|---|---|---|
| JP | 2007316882 | 12/2007 |
| KR | 1020060070280 | 6/2006 |

OTHER PUBLICATIONS

Co-pending U.S. Appl. No. 11/866,280, filed Oct. 2, 2007.

(Continued)

Primary Examiner — Loan Thanh
Assistant Examiner — Sandhara Ganesan
(74) Attorney, Agent, or Firm — Perkins Coie LLP

(57) ABSTRACT

A system and method of providing an interactive training program by monitoring a user's actions is disclosed. A user is prompted through the interactive training program to perform certain movements, the user's movements are monitored relative to the prompted movements, and feedback is provided to the user through the program.

27 Claims, 10 Drawing Sheets

U.S. PATENT DOCUMENTS

| | | | |
|---|---|---|---|
| 2005/0227811 A1* | 10/2005 | Shum et al. ............... | 482/1 |
| 2005/0271279 A1* | 12/2005 | Fujimura et al. ............ | 382/203 |
| 2006/0018516 A1* | 1/2006 | Masoud et al. ............. | 382/115 |
| 2006/0202953 A1* | 9/2006 | Pryor et al. ................ | 345/156 |
| 2007/0298883 A1* | 12/2007 | Feldman et al. ............ | 463/36 |
| 2008/0139307 A1* | 6/2008 | Ueshima et al. ............ | 463/36 |
| 2008/0225041 A1* | 9/2008 | El Dokor et al. ........... | 345/419 |
| 2008/0244465 A1 | 10/2008 | Kongqiao et al. | |
| 2008/0258921 A1* | 10/2008 | Woo et al. ................. | 340/573.1 |
| 2009/0023555 A1* | 1/2009 | Raymond ................... | 482/9 |
| 2009/0048070 A1* | 2/2009 | Vincent et al. ............. | 482/8 |
| 2009/0085864 A1* | 4/2009 | Kutliroff et al. ........... | 345/156 |
| 2009/0113389 A1* | 4/2009 | Ergo et al. ................. | 717/120 |
| 2009/0232353 A1* | 9/2009 | Sundaresan et al. ........ | 382/103 |
| 2009/0234614 A1* | 9/2009 | Kahn et al. ................ | 702/141 |
| 2009/0262986 A1* | 10/2009 | Cartey et al. .............. | 382/107 |
| 2010/0034457 A1 | 2/2010 | Berliner et al. | |
| 2010/0103093 A1* | 4/2010 | Izumi ........................ | 345/156 |

OTHER PUBLICATIONS

Co-pending U.S. Appl. No. 12/707,340, filed Feb. 17, 2010.

Co-pending U.S. Appl. No. 12/817,102, filed Jun. 16, 2010.

C. Keskin, et al., Real Time Hand Tracking and 3D Gesture Recognition for Interactive Interfaces Using HMM, Computer Engineering Dept. Bogazici University, pp. 1-4.

International Search Report PCT/US2010/023179 dated Sep. 16, 2010, pp. 1-3.

Jakub Segen, et al., Fast and Accurate 3D Gesture Recognition Interface, Bell Laboratories, Holmdel, NJ 07733, 6 pages.

Vladimir I. Pavlovic, et al., Visual Interpretation of Hand Gestures for Human-Computer Interaction: A Review, Department of Electrical and Computer Engineering, and The Beckman Institute for Advanced Science and Technology University of Illinois at Urbana-Champaign, 36 pages.

Written Opinion PCT/US2010/023179 dated Sep. 16, 2010, pp. 1-4.

Y. Zhu, B., Dariush, K., Fujimura, "Controlled Human Pose Estimation from Dept H Image Streams" IEEE Computer Society Conference on Computer Vision and Pattern Recognition Workshops (CVPRW 08), pp. 1-8, Jun. 23-28, 2008. See abstract: Sections 2, 3, and 5: figure 1.

* cited by examiner

METHOD AND SYSTEM FOR INTERACTIVE FITNESS TRAINING PROGRAM

CROSS-REFERENCE TO RELATED APPLICATION(S)

This application claims the benefit of priority to U.S. Provisional Patent Application Ser. No. 61/058,173, filed Jun. 2, 2008, entitled "Interactive Fitness Training Program" by Gershom Kutliroff, which application is hereby incorporated by reference.

TECHNICAL FIELD

The present disclosure relates generally to interactive training programs that prompt a user to perform fitness movements, monitor the user's movements, and provide feedback to the user.

BACKGROUND

Interactive computer gaming has recently become extremely popular. For example, Sony's EyeToy® was the first mass-market application to enable a user to control a game through the use of a camera which captured the user's physical movements. Nintendo's Wii™ included controllers that detected the movements of a user's hands during game play through the use of accelerometers and infrared detection.

SUMMARY

A user can be motivated to perform fitness movements as part of a training program through the use of a virtual environment, such as an obstacle course. An avatar is used to represent the user in the virtual environment. Performance of prompted movements by the user progresses the avatar through the virtual environment.

The movements of the user in response to the prompt can be compared to the fitness movements stored in a database by using a similarity measure which calculates how similar two gesture data sets are to each other. If the similarity measure for a user's movements as compared to a particular gesture in the library is higher than a threshold value associated with that gesture, it is likely that the user's movements have been identified as that gesture. The similarity measure is a function of the baseline data, the data of the user's movements, a weighting function dependent upon time, and a weighting function dependent upon the feature points of interest.

A user's movements can also be monitored by imposing the user's movements upon the avatar in the virtual environment, using collision boxes in the virtual environment to determine in which direction and how far a user has moved.

Once the user's movements have been identified, they can be analyzed to provide feedback to the user about his performance in the current training session and any improvements over previous training sessions.

BRIEF DESCRIPTION OF THE DRAWINGS

Examples of an interactive fitness training program system and method are illustrated in the figures. The examples and figures are illustrative rather than limiting.

DETAILED DESCRIPTION

Figure 1:
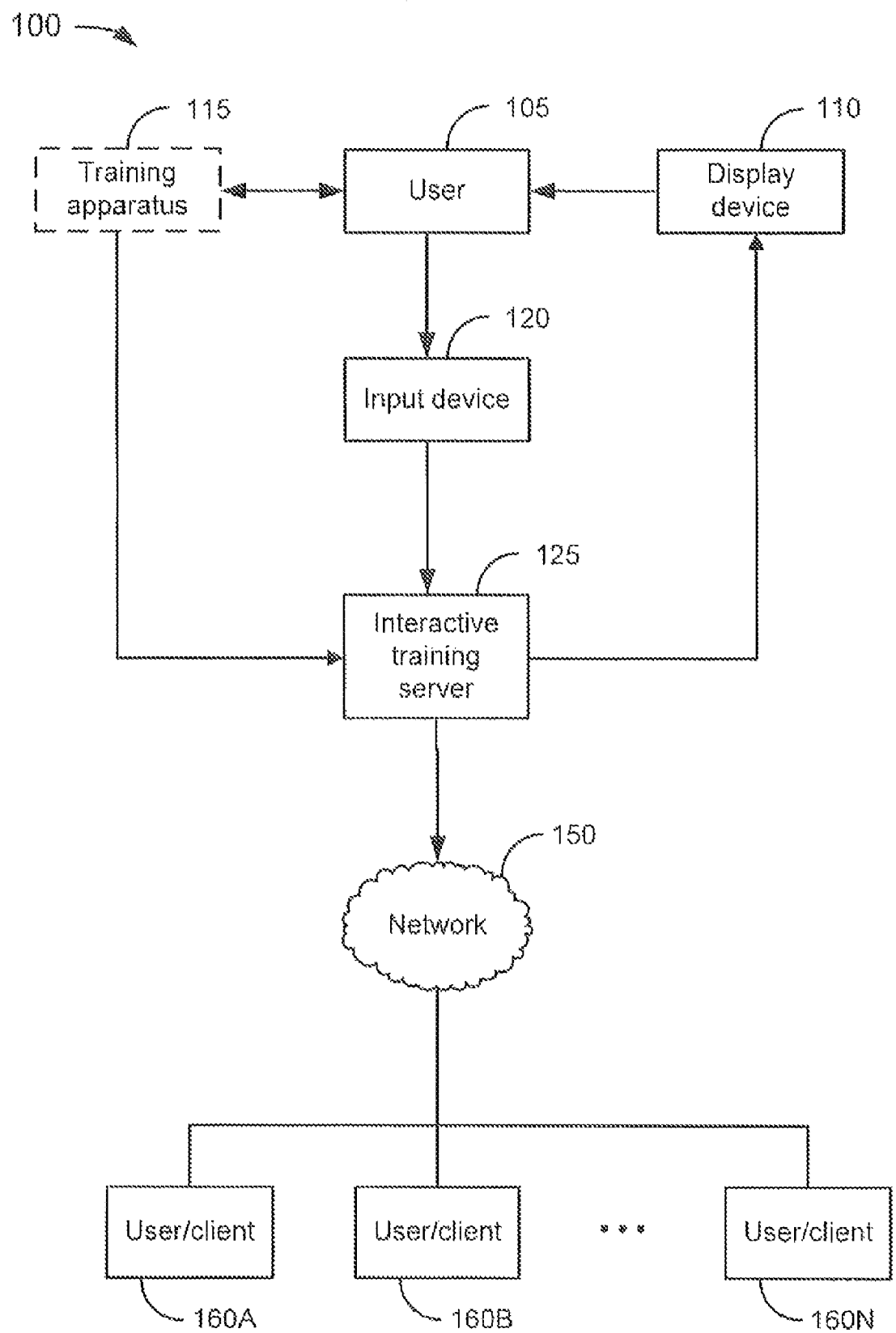
FIG. 1 shows an example block diagram of a system for monitoring a user's fitness routine during the course of an interactive game and/or training program and communicating with users.

The following description and drawings are illustrative and are not to be construed as limiting. Numerous specific details are described to provide a thorough understanding of the disclosure. However, in certain instances, well-known or conventional details are not described in order to avoid obscuring the description.

Without intent to further limit the scope of the disclosure, examples of instruments, apparatus, methods and their related results according to the embodiments of the present disclosure are given below. Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

The terminology used in the description presented below is intended to be interpreted in its broadest reasonable manner, even though it is being used in conjunction with a detailed description of certain specific examples of the disclosure. Certain terms may even be emphasized below; however, any terminology intended to be interpreted in any restricted manner will be overtly and specifically defined as such in this Detailed Description section.

Video games where a user participates in a fitness program, plays a sport, or engages in a game of an kind are greatly enhanced when the user's movements are monitored to provide feedback to the user, thus making the video game interactive. Fitness programs may include yoga, tai chi, martial arts, and racing. Sports programs may include baseball, football, tennis, soccer, martial arts. Gaming programs may include adventure scenarios, quests, racecourses, battle scenarios, and rescue missions. All of these interactive programs can more easily engage users when the user's movements are displayed on a screen, providing direct visual feedback to the user in real-time. In particular, exergaming, an activity where exercise or a fitness program is combined with gameplay, such as video gameplay, can offer a fully interactive and immersive experience when a user's movements are incorporated into the flow of action displayed upon a screen. During the exergaming program, a player receives real-time feedback and encouragement on his or her progress, while the visual and audio cues of the game prompt the player to do more, work harder, and reach personal milestones.

In one embodiment, the interactive program can be an interactive fitness training program. FIG. 1 shows an example block diagram of a system 100 for prompting and monitoring a user's fitness routine during the course of an interactive game and/or training program and communicating with users.

The interactive program is run on an interactive training server or processor 125. Non-limiting examples of devices that the server 125 can be part of include a computer or a gaming console. Alternatively, the training program may be run on a stand-alone server or processor dedicated to running interactive programs.

The user 105 receives visual prompts from the program to perform particular fitness movements/gestures through a display device 110 and/or verbal prompts through speakers (not shown). The display device 110 can include, but is not limited to, a monitor or television. The prompts can be an on-screen representation of a person or character performing the movements with additional text descriptions to aid users in performing the requested movements.

The user 105 positions himself in front of the input device 120 and responds to prompts from the program. A non-limiting example of the input device 120 includes a video camera, such as an RGB video camera and/or a depth camera. Movements made by the user are captured in a sequence of images by the input device 120 and then processed by the server 125. The server 125 performs functions including, but not limited to, detecting and performing gesture recognition on a user's movements and monitoring direction and relative distance moved by a user. In one embodiment, the server 125 includes a memory (not shown) for storing the images of the user's movements. In one embodiment, the server 125 includes a database of fitness movements (not shown) that is used with detecting and performing gesture recognition. The fitness movement database 135 stores sequences of images and threshold values for particular fitness movements and/or series of fitness movements used in the interactive training program.

In some embodiments, the fitness movement database and/or the memory are not local to the server 125 but rather are accessible over a network, such as network 150. Then the database and/or the memory can be shared by other interactive training servers similar to server 125. In some instances, the communications between the server 125 and the input device 120, display device 110, and/or the training apparatus 115 can also be over a network.

In some instances, the server 125 can also receive requests from users 160A-N over a network 150 for reports and/or video recorded of the user's fitness sessions. Reports can include quantitatively analyses and data of the user's performance and response to prompted fitness movements. In one embodiment, a user can specify and transmit targeted fitness objectives to the server 125 using a computer over the network 150, and the server 125 can generate a customized fitness program in response.

In one embodiment, a user 105 can specify particular people to receive a copy of the reports and videos of the user's fitness sessions. In one embodiment, the specified people can be granted passwords to permit access to a memory in the server 125 that stores the reports and/or the video.

The training apparatus 115 is an optional element of the system. The training apparatus 115 includes any type of device that can measure a user's physiological responses, for example, heart rate and respiration rate. In one embodiment, the training apparatus 115 can be coupled to the server 125 to provide additional data about the user's fitness. The training apparatus 115 can also include devices that do not couple to the server, for example, hand weights for challenging a user's strength, speed, and/or stamina.

Figure 2A:
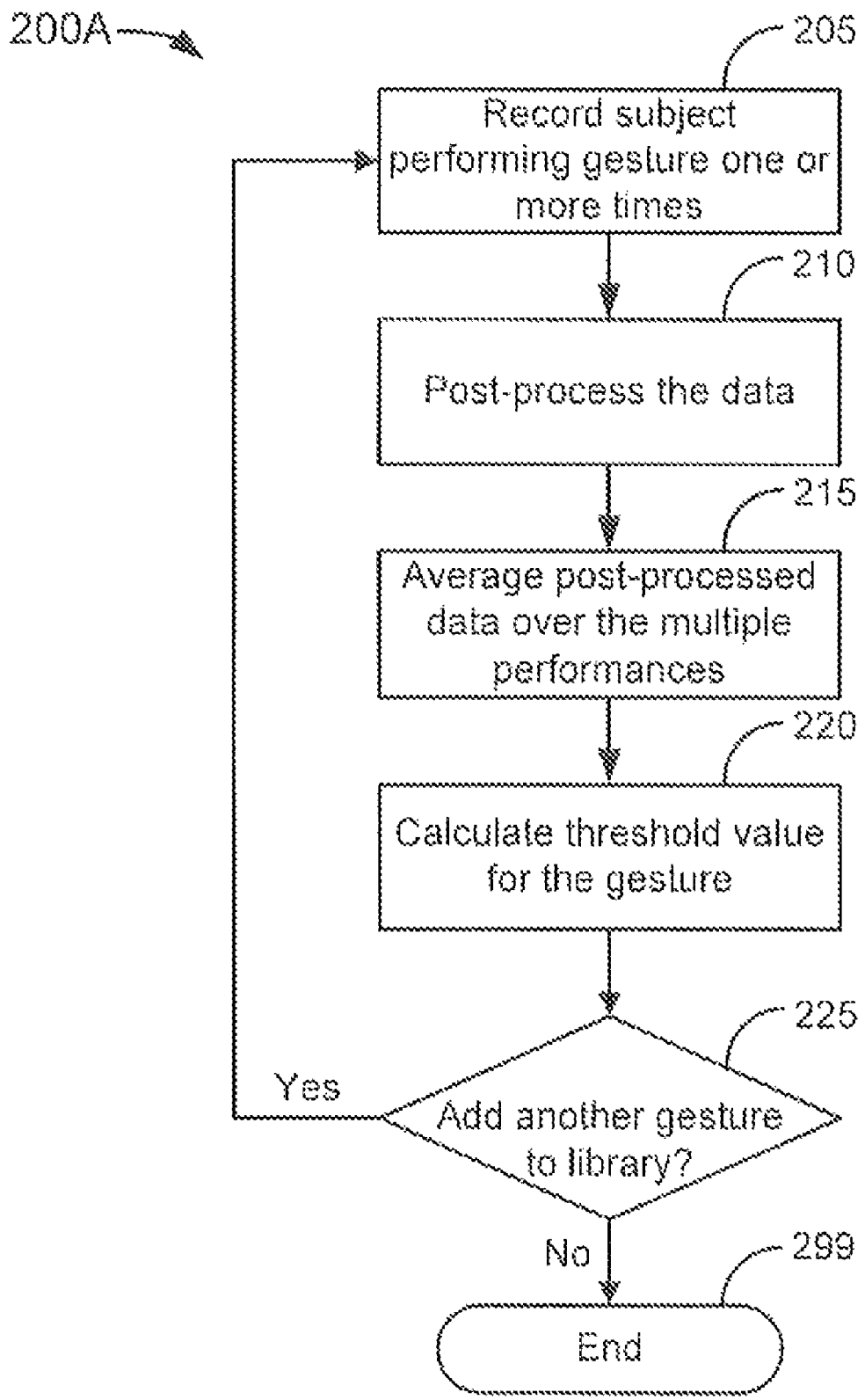
FIG. 2A depicts a flow diagram illustrating a method of creating a library of gestures using video camera equipment, according to an embodiment of the disclosure.

In one embodiment, the server 125 can classify a user's movements as a particular gesture by comparing the user's movements to a known set of gestures catalogued and stored in a gesture library. For each gesture in the library, baseline or "ground truth" data is first generated in a pre-processing step for each gesture. The "ground truth" data is then used as a baseline against which a user's movements are compared in order to classify the movements as a particular gesture. Data characterizing the relative positions of the feature points of interest over several images in a sequence are used for the comparison. FIG. 2A shows one method 200A by which "ground truth" data may be obtained for the gesture library.

At block 205, at least one subject is recorded performing a gesture of interest multiple times. A sensor is placed on each feature point of interest on the subject's body, and video camera equipment is used to record the subject's movements in a sequence of images. Feature points of interest may include joints and locations corresponding to, for example, the subject's left hand, left elbow, left shoulder, or head. It will be apparent to a person skilled in the art that many other locations on a subject's body may also be feature points of interest. The output of block 205 is a set of three-dimensional points with each point corresponding to one feature point in each image in the sequence.

At block 210, the data from the motion capture sessions are post-processed by manually cleaning and smoothing the data using standard techniques for processing motion capture data. It will be apparent to a person skilled in the art that other post-processing steps may also be performed. The data is then averaged at block 215 over the multiple times that the gesture is performed in order to minimize bias. In one embodiment, many different subjects are recorded performing the gesture, and the gestures of the different subjects are averaged to prevent overfitting the ground truth data to one person.

A similarity measure is a function that quantitatively compares the similarity of two gesture sets with each other. The higher the similarity measure value, the more similar a person's movements are to a known gesture that the movements are being compared to. At block 220, a threshold value is calculated for the gesture such that if a similarity measure comparing the gesture to a person's movements is greater than a threshold value for that particular gesture, it is likely that the person's movements have been identified as that gesture.

At block 225, the system queries whether another gesture is to be 205 to the gesture library. If so, the above process is repeated beginning at block 205 with the recording of at least one subject performing the new gesture. If no further gestures are to be added to the library, then the gesture library is complete. The process ends at block 299.

Figure 2B:
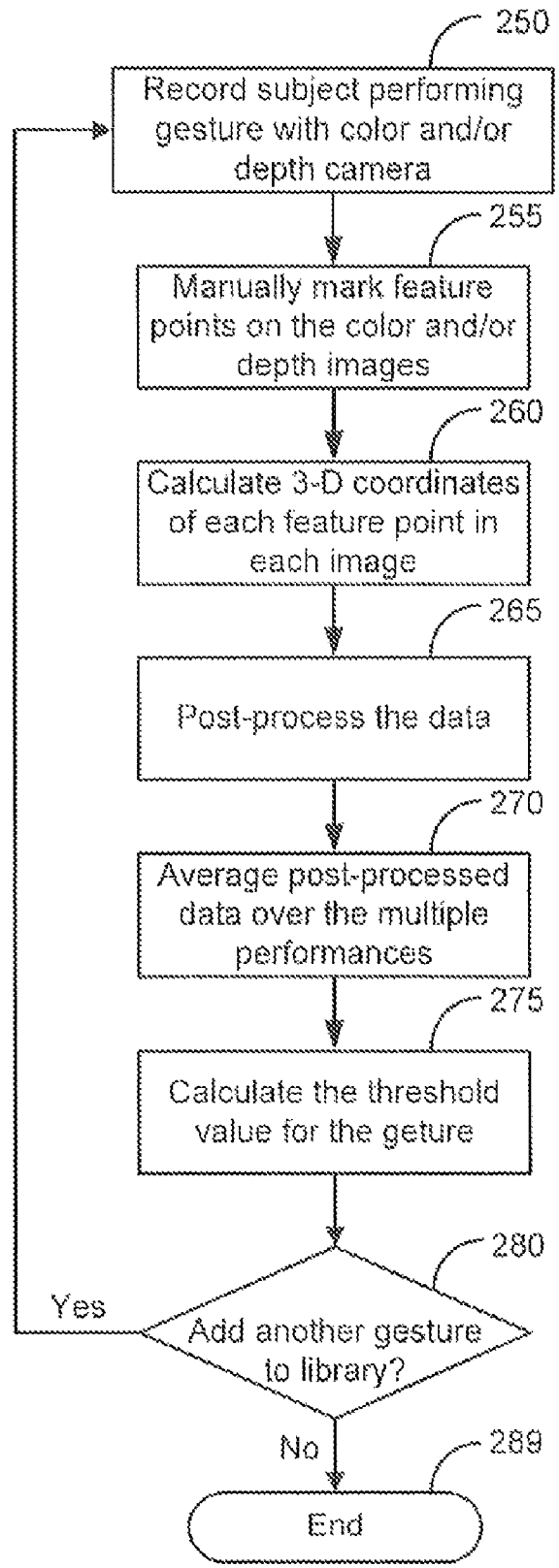
FIG. 2B depicts a flow diagram illustrating a method of creating a library of gestures using color and/or depth images, according to an embodiment of the disclosure.

FIG. 2B shows an alternative process 200B by which "ground truth" data for a gesture and its corresponding gesture threshold value may be obtained for a gesture library. At block 250, a video camera capable of recording color and/or depth images is used to record at least one subject performing a gesture of interest several times. At block 255, the positions of the feature points of interest are manually marked on the sequences of color and/or depth images. At block 260, three-dimensional coordinates of each feature point of interest are calculated for each color-depth pair of images in the sequence of images capturing the gesture, if both color and depth images have been captured. Alternatively, only color or only depth images can be used. Post-processing of the data occurs at block 265. Post-processing steps that may be performed include smoothing the data temporally and spatially. It will be apparent to a person skilled in the art that other post-processing steps may also be performed.

The data is then averaged at block 270 over the multiple times that the gesture is performed in order to minimize bias. In one embodiment, many different subjects are recorded performing the gesture, and the gestures of the different subjects are averaged to prevent overfitting the ground truth data to one person.

At block 275, a threshold value is calculated for the gesture such that if a similarity measure comparing the gesture to a person's movements is greater than a threshold value for that particular gesture, it is likely that the person's movements have been identified as that gesture.

At decision block 280, the system queries whether another gesture is to be added to the gesture library. If so, the above process is repeated beginning at block 250 with the recording of at least one subject performing a new gesture. If no further gestures are to be added to the library, then the gesture library is complete. The process end at block 289.

Figure 3:
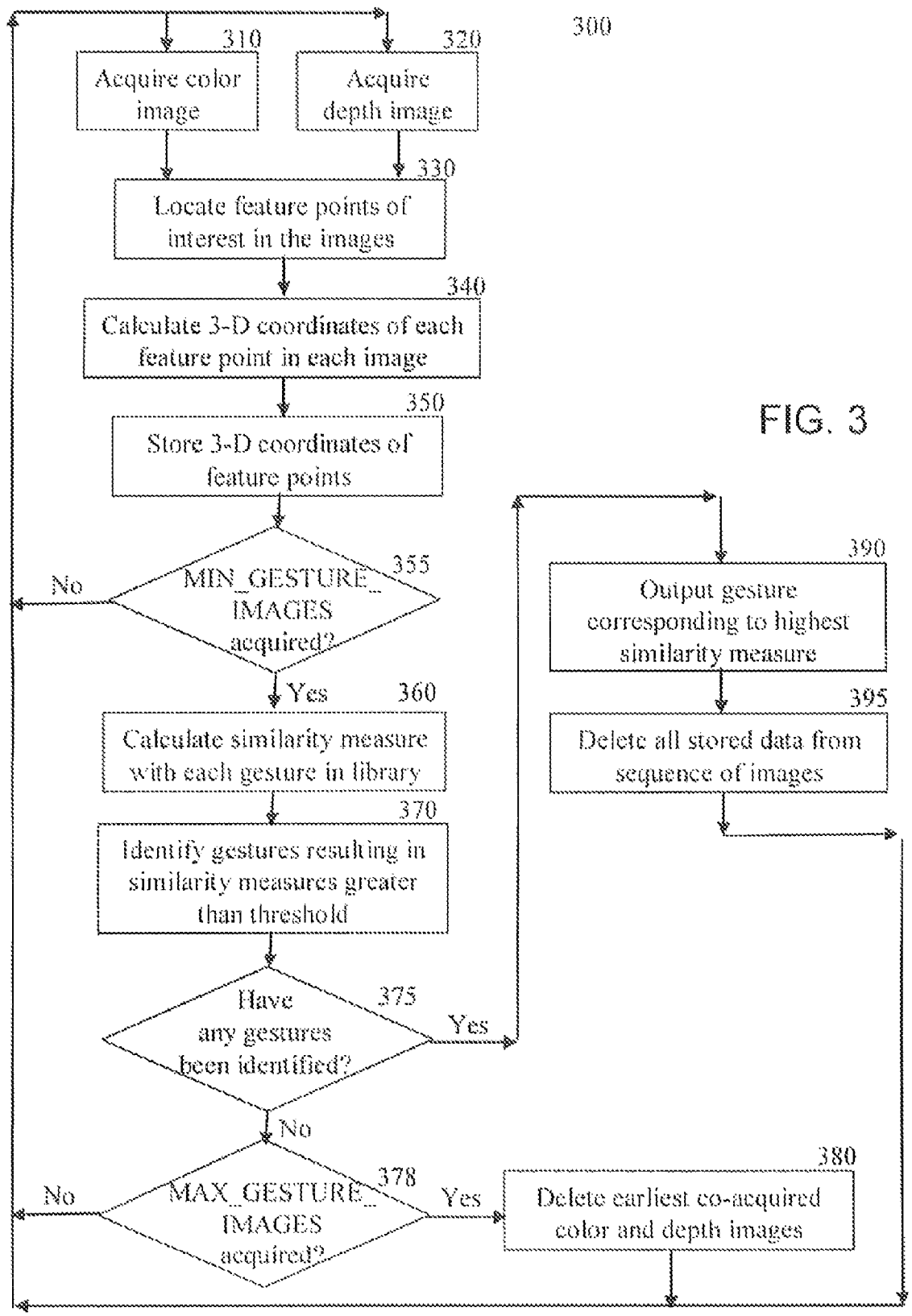
FIG. 3 depicts a flow diagram illustrating a method of identifying a gesture from movements captured in a sequence of images, according to an embodiment of the disclosure.

FIG. 3 is a flow chart illustrating a method 300 of identifying a user's movements as particular gestures according to an embodiment of the disclosure. In step 310, a image of the user is acquired. At block 320 a depth image of the user is acquired by using a depth camera that can sense distance between an imaging sensor in the camera and objects in the camera's field of view. In one embodiment, both color and depth images are captured simultaneously. In one embodiment, only color images are captured, and step 320 is omitted. In one embodiment, only depth images are captured, and step 310 is omitted.

If both color and depth images are captured, blocks 310 and 320 are performed simultaneously by a camera with two lenses, one for acquiring color images and one for acquiring depth images. A color image is a digital representation of an image which contains multiple channels, and each channel corresponds to a different color. In one embodiment, three channels are used, and each channel corresponds to one of the colors red, green, and blue. However, any other suitable number of colors and color selection may be assigned to the multiple channels. Each channel is composed of an identical number of pixels, and each pixel has an intensity value between zero and a maximum number. The maximum number is 255 in the one embodiment but may be larger or smaller depending upon the application of the images. The value of each pixel corresponds to the contribution of that color channel at each pixel's location.

A depth image contains a single channel composed of the same number of pixels as each color channel. The value of each pixel in a depth image corresponds to the distance between the camera lens and the user at each corresponding pixel's location. Different technologies may be used for generating depth images, including time of flight, stereoscopic vision, and triangulation. It will be apparent to a person skilled in the art that other technologies may be used for generating the images. The color images and the depth images may be analyzed and processed independently.

Typically, gestures occur over some span of time. Because it is not known when a user will begin to make any given gesture, images are taken sequentially of the user, and multiple images over a span of time are recorded for analysis. The multiple images each include a color and depth image as discussed above. The following steps apply to each of the multiple images in the sequence.

The color and depth images acquired at blocks 310 and 320 are used to locate feature points of interest on the user's body at block 330. Feature points of interest may include joints and locations corresponding to, for example, the user's left hand, left elbow, left shoulder, or head. It will be apparent to a person skilled in the art that many other locations on a user's body may also be feature points of interest, and gestures may be made by any part or parts of a user's body.

At block 340, three-dimensional coordinates for each one of the feature points of interest are computed from the color and depth images. The coordinate locations for each of the feature points of interest are stored at block 350 for the frame corresponding to the co-acquired color and depth images.

Classification of a user's recorded movements is accomplished by comparing the movements with each of the gestures stored in a gesture library. Each gesture in the library consists of a sequence of images covering the period of time required to perform the gesture, with a uniform time lapse occurring between images in the sequence. Each gesture is associated with a minimum number of sequential images sufficient to capture the entire movement of the gesture. Thus, a quick gesture like a finger snap requires fewer sequential images, while a gesture that takes a longer time to perform, for example, a handshake, requires more sequential images. At block 355, if the minimum number of sequential images required to capture any gesture in the library has not been acquired and stored, the process returns to blocks 310 and 320 where another set of color and depth images is co-acquired and appended to the sequence of images being analyzed.

Once the minimum number of sequential images required to capture a particular gesture has been stored for analysis, block 360 makes a quantitative comparison of the user's movements with each gesture in the library through the use of a similarity measure. A similarity measure calculates how similar two gesture data sets are to each other; the higher the similarity measure value is, the more similar the two gesture data sets are. A sample similarity measures is described in more detail below. Thus, at block 360, a set of similarity measure values are obtained by comparing the user's movements to each gesture in the library.

Then at block 370, each of the similarity measure values in the set are compared to the threshold value for the particular gesture which was used to obtain the similarity measure value. Gestures which result in a similarity measure value greater than the gesture's pre-calculated threshold value, if any, are identified and passed to block 375.

At block 375, if at least one gesture has been identified which produced a similarity measure value greater than the corresponding threshold value, the gesture in the library which produced the highest similarity measure value is identified as the gesture that the user made and is output at block 390. Then at block 395, the sequence of images acquired at blocks 310 and 320 is deleted, and the process subsequently returns to blocks 310 and 320 to obtain a new set of color and depth images to identify the next movements made by the user.

At block 375, if no gestures were identified which produced a similarity measure value greater than the corresponding threshold value, then no known gesture was detected in the time period spanned by the sequential images co-acquired at blocks 310 and 320 and used to calculate the similarity measure values at block 360. Thus, block 390 does not output any gesture as having been identified. Instead, the process flows to decision block 378.

At decision block 378, the system determines if the maximum number of gesture images have been acquired. The maximum number of images corresponds to the number of images required to capture the gesture in the database having the longest duration. If the maximum number of images has not been acquired yet, the process returns to blocks 310 and 320.

If the maximum number of images has already been acquired, the process continues to block 380 where the earliest co-acquired color and depth images in the sequence of images stored for analysis are deleted. Then the process returns to blocks 310 and 320 where another set of color and depth images of the user is co-acquired and appended to the sequence of images for analysis.

The method 300 of identifying a user's movements as particular gestures can be carried out using only color images or only depth images. If only color images are captured, the video camera equipment does not need to be capable of capturing depth images, step 320 is omitted, and the subsequent steps in the method 300 only operate upon the captured color images. Similarly, if only depth images are captured, the video camera equipment does not need to be capable of capturing color images, step 310 is omitted, and the subsequent steps in them method 300 only operate upon the captured depth images.

Figure 4:
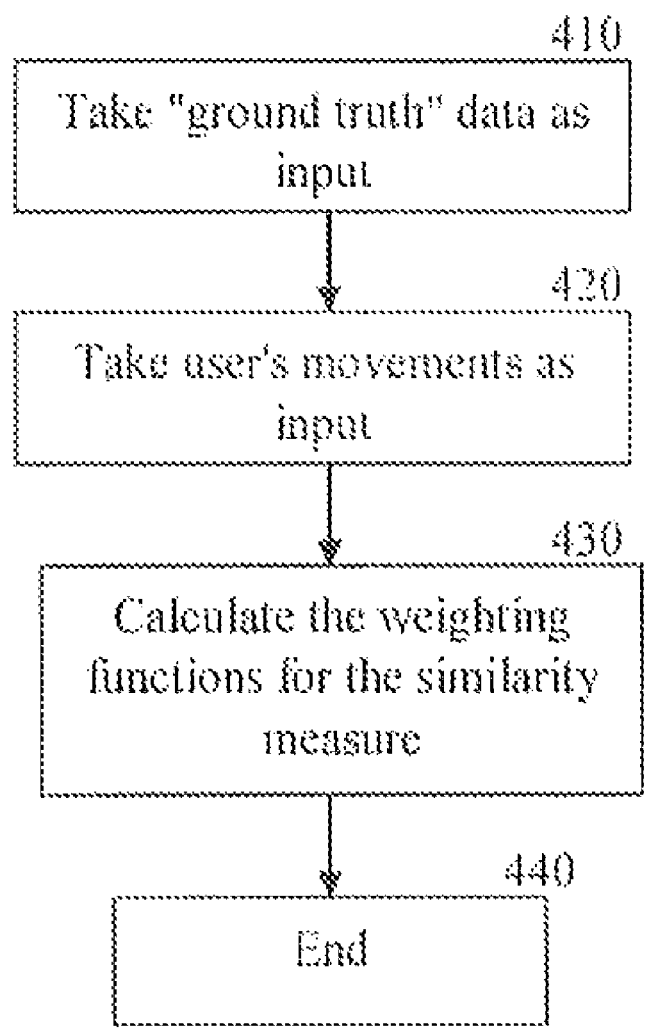
FIG. 4 depicts a flow diagram illustrating a method of calculating a similarity measure for use in classifying gestures, according to an embodiment of the disclosure.

The flow chart in FIG. 4 illustrates a method 400 of calculating a similarity measure for use in differentiating and classifying gestures. The similarity measure is a function of the "ground truth" data for a known gesture, a weighting function dependent upon time, a weighting function dependent upon the feature points of interest, and the positional data acquired of a user's movements over a period of time.

At block 410, the "ground truth" data for each gesture in the gesture library is taken as an input for calculating the similarity measure. The "ground truth" data is represented as $x(i,j)$, where the variable i takes on the values $\{1, 2, \ldots m\}$ and refers to the feature points of interest, and the variable j takes on the values $\{1, 2, \ldots n\}$ and refers to the relative time in the gesture sequence for which the "ground data" is applicable.

Next, at block 420, the user's movements acquired with the color and/or depth camera are taken as another input for calculating the similarity measure value. The user's movements are represented as $y(i,j)$, where the variable i takes on the values $\{1, 2, \ldots m\}$ and refers to feature points of interest on a user's body, and the variable j takes on the values $\{1, 2, \ldots n\}$ and refers to the relative time in the sequence of images of the user's movements.

One sample similarity measure that may be used for classifying movements as gestures is:

$$S_{u,v}(\vec{x}, \vec{y}) = \sum_{j=1}^{n} u(j) \sum_{i=1}^{m} w(i)|x(i, j) - y(i, j)|,$$

where $u(j)$ is a function of time and $w(i)$ is a function of the feature points of interest. Then let:

$$S_{u,w}(x, y) = \begin{cases} \hat{S}_{u,w}(x, y) & \text{when } x \text{ is the gesture described by } y, \text{ and} \\ \tilde{S}_{u,w}(x, y) & \text{when } x \text{ is NOT the gesture described by } y \end{cases}.$$

At block 430, the weighting functions $u(j)$ and $w(i)$ must be determined over the entire set of x and y such that the value of the function $\hat{S}_{u,w}(x,y)$ is minimized, and the value of the function $\tilde{S}_{u,w}(x, y)$ is maximized. The process ends at block 440.

The process of determining the weighting functions for the similarity measures can be, in general, done offline, prior to the time when the classification of gestures needs to be made. Thus, a memory-intensive and computation-intensive algorithm may be used to calculate the values of $\hat{S}_{u,w}(x, y)$ and $\tilde{S}_{u,w}(x, y)$ for all of the possible weighting functions and to choose the optimal values for the weighting functions to satisfy the above requirements for $S_{u,w}(x,y)$. After obtaining the optimal weighting functions, the similarity measure threshold values may then be calculated for each gesture in the gesture library. It will be apparent to a person skilled in the art that other similarity measure functions may be used which use the same weighting functions in a different manner, use other types of weighting functions, or uses the "ground truth" data and the data acquired from the user's movements in a different manner.

Figure 5:
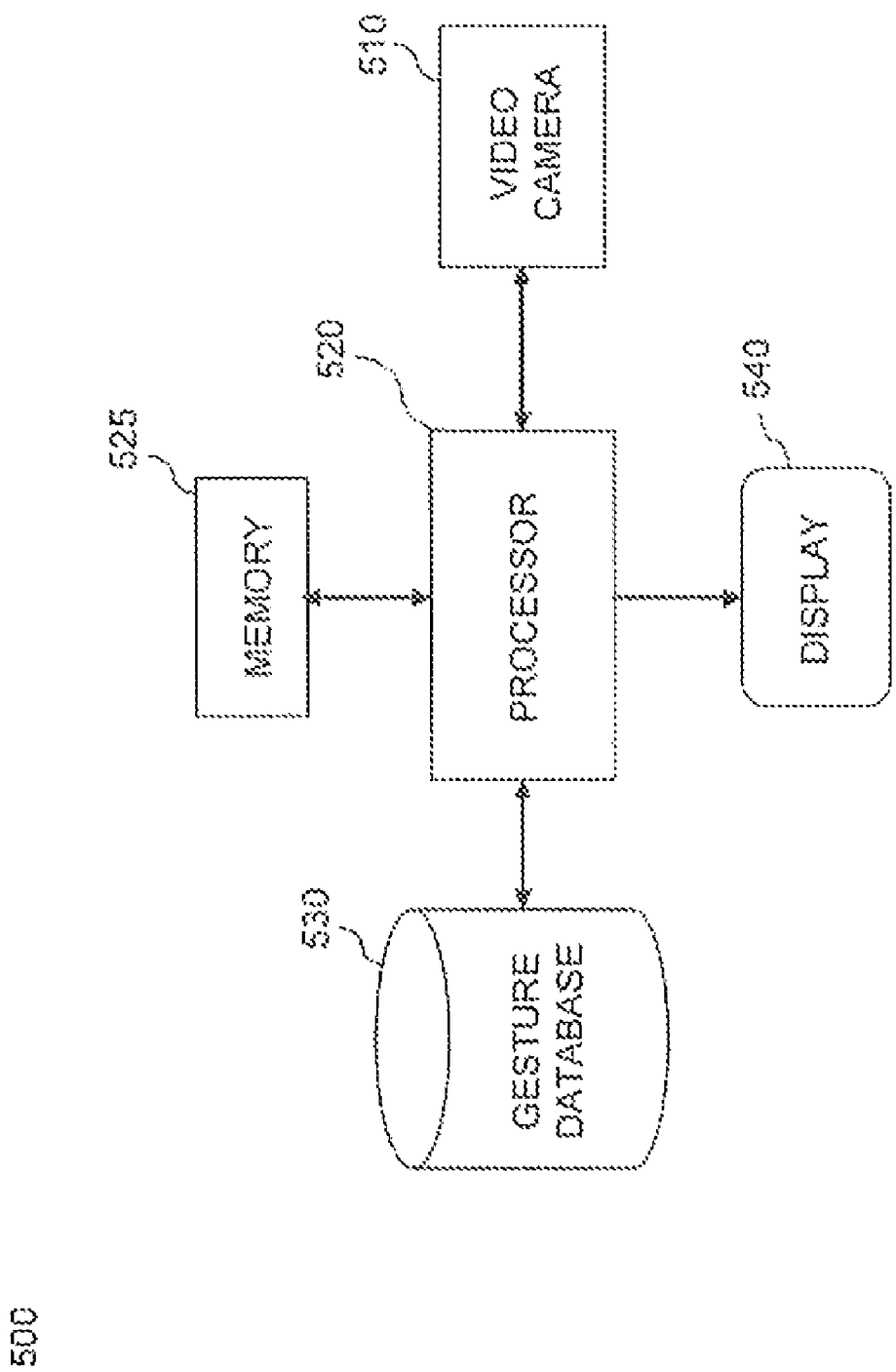
FIG. 5 shows a block diagram of one embodiment of the gesture classification system.

FIG. 5 shows a block diagram of one embodiment of the gesture classification system 500 incorporated into an interactive program. The video camera equipment 510 is used to capture a user's movements. The video camera equipment 510 takes simultaneous color and depth images of the user, and the images are sent to the processor 520 for processing. Alternatively, the video camera equipment 510 can take either just color images or just depth images.

The processor 520 locates feature points of interest in the color and/or depth images, calculates three-dimensional coordinates for each feature point in the color and/or depth images, stores the coordinates in memory 525 for processing, ensures the minimum number of images have been acquired, calculates similarity measures by comparing the movements with each gesture in the database 530, identifies gestures that result in similarity measures greater than the threshold value for the gesture that the movements have been compared with, identifies the highest similarity measure obtained, prompts the video camera equipment 510 to acquire additional images, controls the memory 525 to delete processed images, and outputs identified gestures to the display 540, thus providing feedback to the user. The processor 520 also runs the interactive program which the user experiences virtually through the display 540.

The display 540 presents an image of the user performing the gesture identified by the processor 520. The image of the user is incorporated into the virtual environment of the interactive program which is also presented by display 540.

In one embodiment of the system 100 shown in FIG. 1, rather than classifying a user's movements as a particular gesture, the server 125 can substantially impose the user's movements onto the avatar in the virtual environment, such that the avatar substantially mimics the user's movements. Then the user's movements in response to prompts can be identified by monitoring the avatar's movements through the use of software algorithms that monitor collision boxes in the virtual environment. For example, if the avatar is walking along a path in the virtual environment, a virtual three-dimensional collision box (not visible to the user on the display) can be placed above the avatar and to move along with the avatar. Then if the avatar jumps so that the avatar's head collides with the collision box, the server 125 detects that the avatar collided with the box. The collision of the avatar's head with the collision box is interpreted as a jump by the avatar, and thus by the user. Multiple collision boxes can be used that are suspended at different distances from the top of the avatar's head to detect how high the avatar/user jumped. In another non-limiting example, in a boxing game, a collision box can be placed around the avatar of the user's opponent. Then when the user punches with his right hand, the avatar also punches with his right hand and hits the collision box. The contact between the avatar's right hand and the collision box triggers an event, for example, the opponent gets hurt.

In one embodiment, the server 125 can use a combination of gesture classification, collision boxes, and any other technique to monitor the movements of a user, for example, tracking a user's movements by placing markers on the user's body and tracking the markers' movements.

Figure 6:
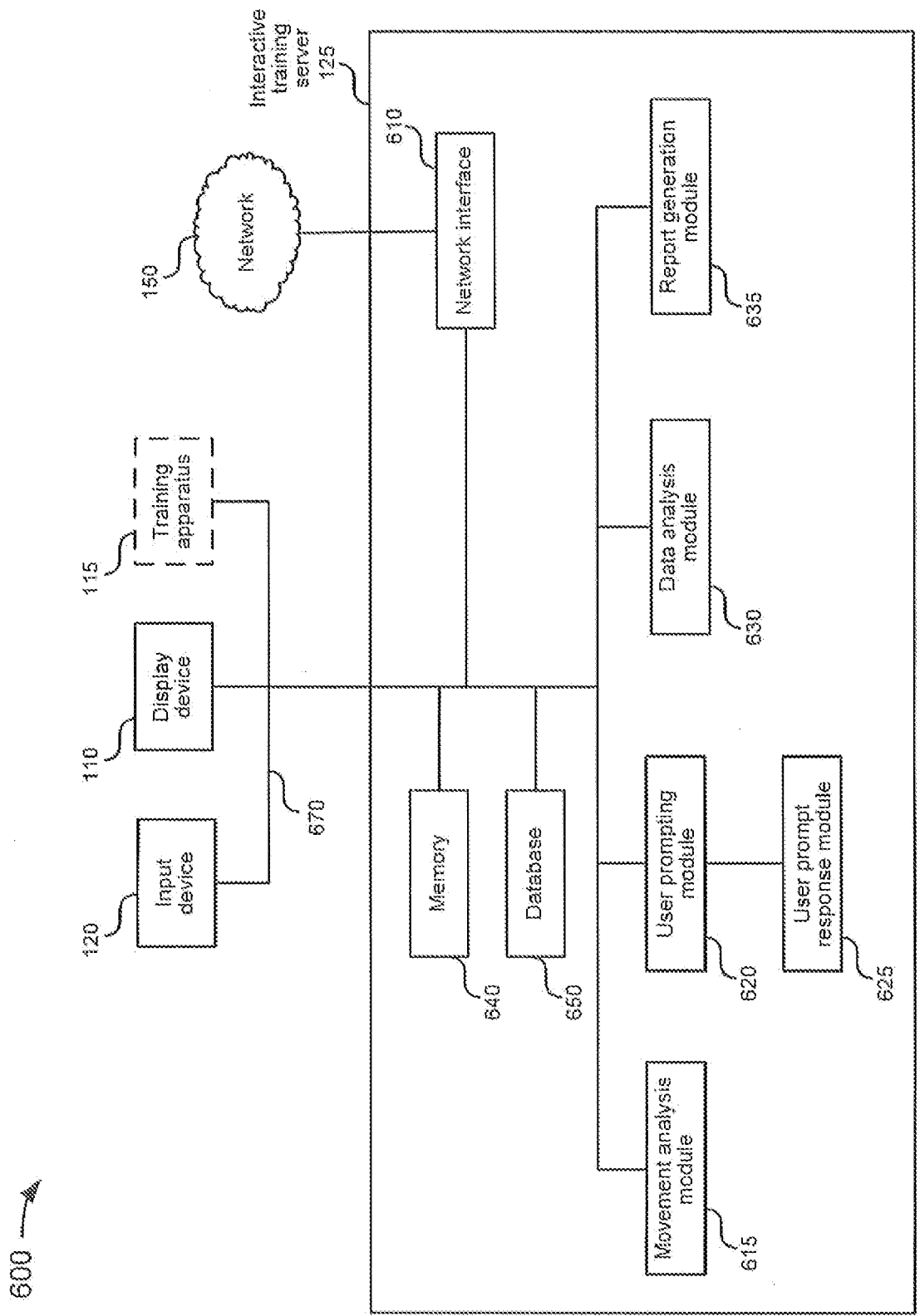
FIG. 6 depicts an example block diagram for the interactive training server.

FIG. 6 depicts an example block diagram 600 for the interactive training server or processor 125. In the example of FIG. 6, the server 125 includes several modules that perform different functions: a movement analysis module 615, a user prompting module 620, a user prompt response module 625, a data analysis module 630, a report generation module 635, a network interface 610, a memory 640, and a database 650.

In the example of FIG. 6, the server 125 communicates with the input device 120, the display device 110, and the optional training apparatus 115 over a bus 670. Alternatively, in some instances the server 125 can communicate with any one of a memory (not shown), a fitness movement database (not shown), the input device 120, the display device 110, and the training apparatus 115 over a network through a network interface, such as network interface 610.

In the example of FIG. 6, the network interface 610 can be one or more networking devices that enable the interactive training server 125 to mediate data in a network with an entity that is external to the server, through any known and/or convenient communications protocol supported by the server and the external entity. The network interface 610 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

In addition, the network interface 610 can manage log-on requests received from one or more users connecting to the server 125 to initiate a particular interactive fitness program, request a customized fitness program, request reports and/or user training videos, and/or otherwise access data related to the user's fitness training sessions. In some instances, authenticated sessions are managed by the network interface 610 for user logon processes.

One embodiment of the server 125 includes a movement analysis module 615. The movement analysis module 615 can be any combination of software agents and/or hardware components able to monitor and/or analyze a user's movements. The movement analysis module 615 can receive input from the input device 120. In one embodiment, the input can be a sequence of RGB images and/or depth images of the user performing one or more movements. The movement analysis module 615 can compare the user's movements to a database having at least fitness movements among other movements in order to identify the movements made by the user, for example by performing the method 300 shown in FIG. 3 for identifying the user's movements or gestures, as described above.

Alternatively or additionally, the movement analysis module 615 can use software algorithms involving collision boxes in the virtual environment to monitor a user's movements without having to explicitly identify the user's movements or gestures. Even moves that are not prompted by the user prompting module 620 can be interpreted using algorithms in conjunction with collision boxes. Then the movement analysis module 615 can send the data from the interpretation of the user's moves to the report generation module 635 for inclusion in the report on the user's performance during the training program.

Data derived from using collision boxes in the movement analysis module 615 can be sent to the user prompting module 620 for use in triggering events in the gameplay. While not all user movements will be triggers for gameplay events, some of the movements can be stored for program tracking purposes.

In one embodiment, the data derived from using collision boxes can be sent to the data analysis module 630 for further analysis of the data in the overall context of the training program.

In one embodiment, the movement analysis module 615 can combine gesture analysis with collision box monitoring, and/or monitor or analyze a user's movements using any other type of technology or algorithms.

One embodiment of the server 125 includes a user prompting module 620. The user prompting module 620 can be any combination of software agents and/or hardware components able to provide cues or prompts to the user in a virtual game environment as part of an interactive fitness routine. The fitness routines can include a combination of physical exercises. The choice of exercises as well as the order and frequency of the exercises can be adapted to a particular user.

In some instances, the prompts can be a video of a person or character performing the requested movement along with a brief description, either on the display or given verbally through speakers. The training program can use an avatar to represent the user, and identified user movements are imposed upon the avatar. In order to progress through the virtual environment, the user must perform the prompted movements. For example, one application may be a virtual obstacle course in which the user is prompted to run in place, jump, hop to either side, and crouch down, as dictated by the context of the game presented on the display device 110 to the user. Another non-limiting example of a virtual environment is a boxing match where the user is prompted to spar with a virtual opponent; the user may be given cues to perform a punching move, such as a jab, cross, hook, and uppercut.

In some instances, the fitness training program can be a straightforward training program that prompts the user to perform certain movements that measure fitness criteria including, but not limited to, speed, strength, agility, and stamina. The program can prompt the user to gradually perform more and more complicated movements until the user is pushed beyond his ability, in order to determine the user's fitness level. Additionally or alternatively, the training program can focus on user-specified targeted fitness objectives.

In one embodiment, the user prompting module 620 can receive data derived from using collision boxes in the movement analysis module 615. The user prompting module 620 can use the data to determine if an event in the gameplay has been triggered. For example, if in a boxing game, the user's avatar is determined by the software algorithms in conjunction with collision boxes to have struck the opponent, this data will trigger a response from the user's opponent, for example, knocking the opponent to the ground if the strike is fast enough and lands in a pre-determined zone of the opponent.

One embodiment of the server 125 includes a user prompt response module 625. The user prompt response module 625 can be any combination of software agents and/or hardware components able to track a user's responses to prompts to perform a movement and provide feedback to the user through the display device 110.

The user prompt response module 625 can include a timer to determine the time elapsed from when the user is first prompted to perform a particular movement. In one embodiment, the elapsed time is shown on the display device 110 to show the user how much time has elapsed and how much time remains for the user to perform or start performing a movement or series of movements. In one embodiment, if the predetermined time has elapsed, the program can continue to the next module or stop the program.

In one embodiment, if a predetermined time has elapsed with no appropriate response having been performed by the user, then the user prompt response module 625 can move the user's avatar backwards through the virtual environment of the training program or game. Thus, the user's physical movements trigger the avatar's progression or regression through the game.

In one embodiment, if the predetermined time has elapsed without an appropriate response from the user, the user prompt response module 625 can generate an enemy that flies at the user's avatar to knock over the avatar if the user does not move the avatar out of the way. The enemy can come from a direction that encourages the avatar/user to move in a direction corresponding to a prompted movement. For example, if the user is prompted to jump, a rattlesnake can appear on the ground and strike the avatar's foot unless the avatar/user jumps in the air.

One embodiment of the server 125 includes a data analysis module 630. The data analysis module 630 can be any combination of software agents and/or hardware components able to analyze identified user movements. The data analysis module 630 can also process any physiological data received from the optional training apparatus 115.

In some instances, metrics that the data analysis module 630 can calculate include, but are not limited to, the total time spent performing each activity and the total time spent in continuous movement, the percentage of successful movements performed that advanced the user within the game, and the percentage of unsuccessful gestures that did not allow the player to advance. Other data that can be derived include, but are not limited to, how high the user jumped, whether the jump heights met the threshold required to advance in the game, and how long the user ran. In one embodiment, the data from a single session can be combined with data from previous sessions to show trends and improvements in fitness and whether fitness goals have been reached. In some instances, scores can be assigned to particular movements, and the data analysis module 630 can calculate the user's overall score and/or scores on particular sections of the training program.

In one embodiment, the data analysis module 630 can interpret the user's movements. For example, the data analysis module 630 can use the number of jumps, hops, time running, etc., as input to calculate the approximate analogous total number of steps taken by the user while playing the game.

In one embodiment, the data analysis module 630 can create customized fitness programs for the user based upon the history of the user's fitness results. For example, if the user does not perform well on a particular exercise, the program can decrease the difficulty of the exercise by lowering the threshold necessary to successfully perform the activity. The program can also increase the duration of that activity in order to give the player more practice in performing that exercise.

In one embodiment, the data analysis module 630 can create customized fitness programs based upon a user-specified fitness objective. For example, the fitness program can be used to strengthen a particular muscle group or train for an upcoming distance race.

One embodiment of the server 125 includes a report generation module 635. The report generation module 635 can be any combination of software agents and/or hardware components able to generate a report using the analyses performed by the data analysis module 630. The report generation module 635 can provide a report having a variety of different presentation formats, for example, text-based results, statistical results, and visual results, for example, in the form of graphs and charts.

The report generation module 635 can immediately provide a report on the display device after the user completes a fitness session and can also send the generated reports and/or video of the user's session to the user and/or to any other person specified by the user, for example, a personal trainer, through the network interface 610. In one embodiment, the reports and/or videos can be sent by email. Additionally or alternatively, the user can log into the system to request particular reports, for example according to the dates of the fitness sessions.

In one embodiment, the interactive training server 125 can include a memory 640 and a database 650. The memory 640 can be used to store data and video of a user's training session, and the database 650 can be used to store movements for detecting and performing gesture recognition.

Figure 7:
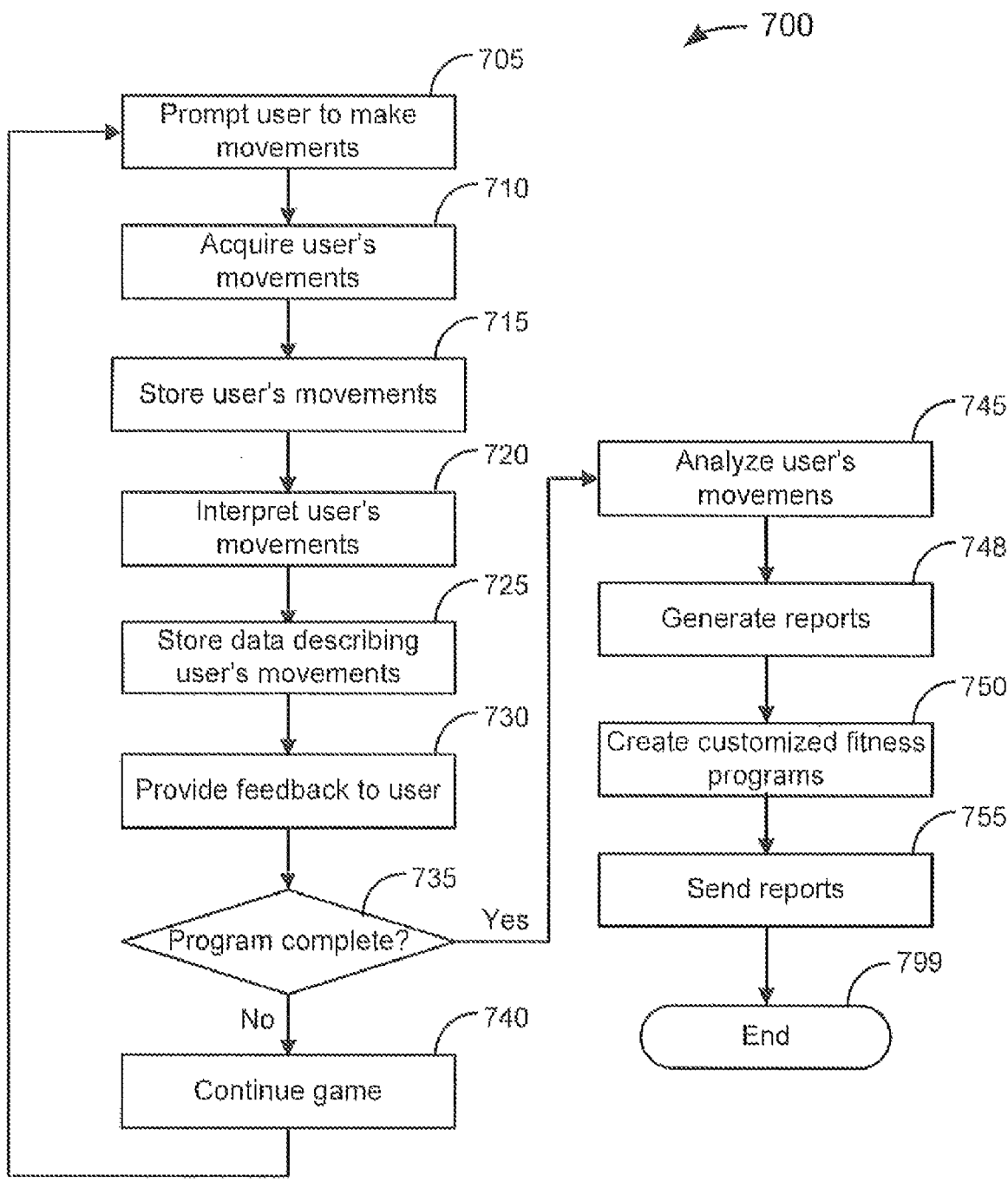
FIG. 7 depicts a flow diagram illustrating a process of prompting a user to make movements as part of an interactive fitness training program, according to an embodiment of the disclosure.

FIG. 7 depicts a flow diagram illustrating a process 700 for prompting a user to make movements as part of a fitness routine and analyzing the movements, according to an embodiment of the disclosure.

At block 705, the user is prompted to make a movement or a gesture. Non-limiting examples of movements and/or gestures include jumping to the left, jumping up with both hands raised in the air, punching directly forward with the right hand, and dodging downward. A series of movements can also be prompted by the program, for example, moving laterally from side to side for one minute or running in place for two minutes. The user is prompted visually on a display device 110 coupled to the server 125 running the interactive program. Additionally or alternatively, the user can also be prompted verbally through a speaker coupled to the server.

The user's movements are acquired at block 710 through the use of camera equipment, for example an RGB video camera and/or a depth camera. The user's movements are captured over several sequential images by the camera equipment and are subsequently stored at block 715 in a memory. The stored movements can by reviewed and critiqued later by the user and/or a personal trainer after the user has completed a session with the training program.

At block 720, the user's movements are interpreted. In one embodiment, the movements are processed and compared to the known movements stored in the database using similarity measures and threshold values. In one embodiment, the movements are interpreted using software algorithms and collision boxes in the virtual environment of the user's avatar. The data of the user's movements resulting from the interpretation are stored in a memory at block 725.

At block 730, feedback is provided to the user through the display device 110. In one embodiment, the interactive program uses an avatar which represents the user in a virtual world, and the user's movements are transferred to the avatar so that the user can see his movements reflected in the movements of the avatar. For example, the avatar is able to bypass obstacles and progress through the virtual world as a consequence of the physical actions performed by the player.

In one embodiment, the user may be required to interact with physical props in order to pass through the obstacles in the virtual game world, for example, by holding weights in his hands.

In one embodiment, elements within the training program motivate the user to perform a particular movement or gesture promptly. For a non-limiting example, a timer on the display screen can indicate a countdown of the remaining time left to perform the activity. Other techniques can be integrated into the gameplay to prompt the user to perform the required gestures including, but not limited to, sliding the user's avatar backwards if the user does not respond within a certain time window and sending an enemy at the avatar to knock it over if the user does not move out of the way.

At decision block 735, the system decides if the training program has finished. If the training program is not complete (block 735—No), at block 740 the training program continues to run, and the process returns to block 705 where the user is prompted to make the next movement.

If the training program is complete (block 735—Yes), at block 745, the system analyzes the identified user's movements to track metrics describing the user's fitness including, but not limited to, the user's strength, agility, speed, and stamina. Some non-limiting examples include how high the user jumped, how quickly the user moved, the quantity of completed exercises, the duration of particular exercise stages completed within the training program, and the duration of the total session.

Then at block 748, one or more fitness progress reports are generated. In one embodiment, graphs can be displayed that show the percentages of the different fitness levels that were successfully completed by the user, and/or the duration of the fitness training sessions. The graphs can cover fitness training sessions over several months or more of user activity. In one embodiment, statistics can be used to show different analyses of the user's data, for example, the percentage of jumps completed successfully, or the user's scores. In one embodiment, the report can include the history of the user's workouts, including the time spent exercising and the specific fitness objectives that were achieved.

Next, at block 750 the system can create customized fitness programs for the user. For example, if the user does not perform well on a particular exercise, the training program can decrease the difficulty of this exercise by lowering the threshold necessary to successfully perform a given physical activity and also increase the duration of the exercise in order to give the player more practice in performing the exercise.

In one embodiment, the system can receive requests from the user and/or the user's personal trainer to create a customized fitness program having particular elements or having specific targeted fitness objectives.

At block 755, the system sends the reports to the user and any other specified recipients, for example, a personal trainer.

In addition to the reports, the raw data and/or the recorded video of the user's training sessions can also be sent. The process ends at block 799.

Players may also interact and socialize with other members of an exergaming network while participating in an exergame, where exercise and video gameplay are combined. An exergaming network enables multiple players to interact within the same virtual environment. Each player may participate from a different location or in the same room with other participants; the physical location of each player is immaterial with the exergaming network. Each player's movements are captured and stored using camera that can detect depth and/or color. The exergaming network then identifies the movements made by each participant and incorporates the movements of the multiple players into one virtual environment. The same virtual environment is then broadcast to each location in which an exergaming participant is located. Thus, an exergaming network can turn an ordinary fitness routine into an interactive gaming experience.

Figure 8:
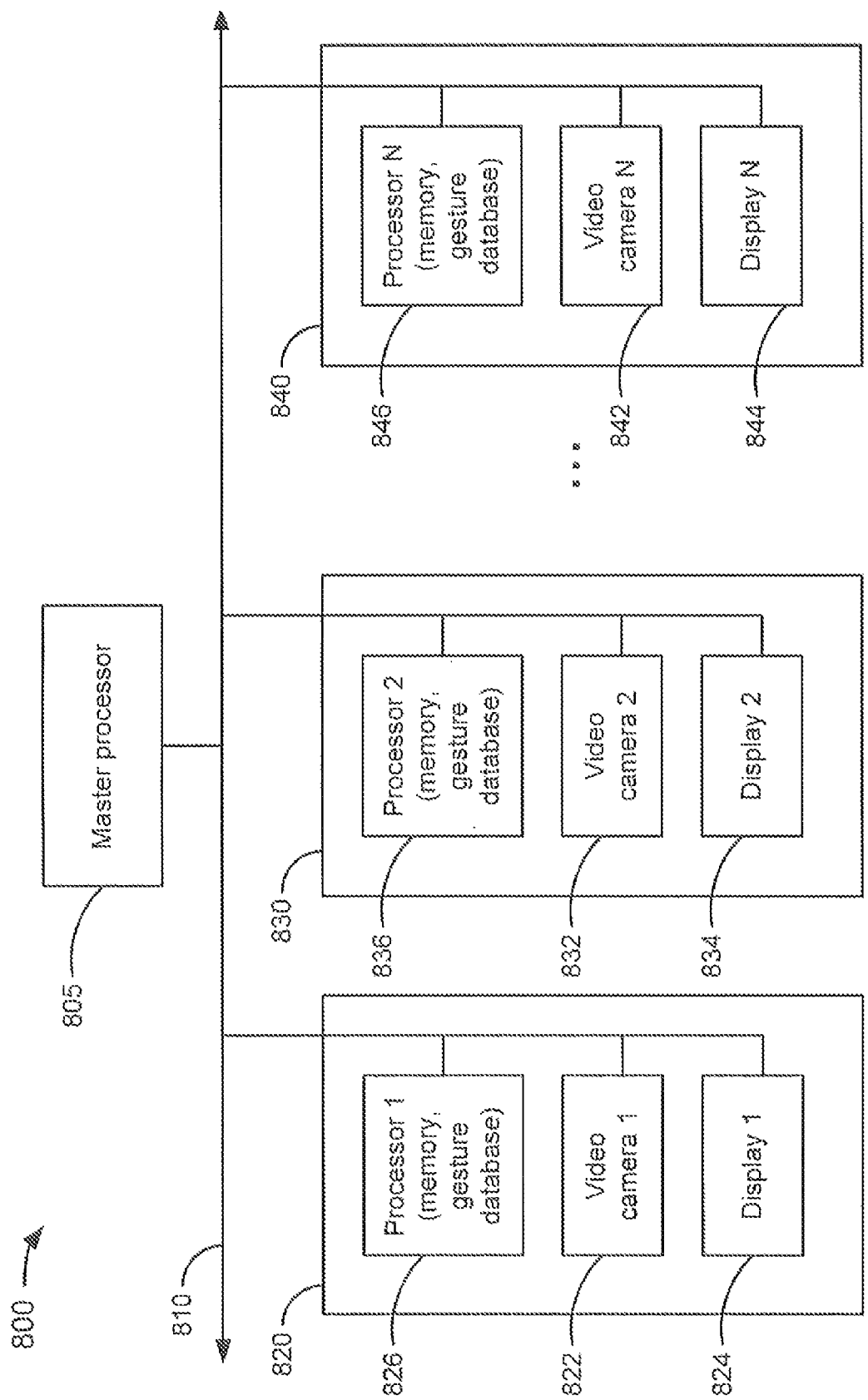
FIG. 8 shows a block diagram of one embodiment of a multi-player interactive training system.

FIG. 8 shows a block diagram 800 of one embodiment of the interactive training system 800 accessible by multiple players over a network. Multiple players may access the same interactive program run by a master processor/server 805 from different locations. FIG. 8 shows three separate sites 820, 830, and 840 from which users can access the same virtual environment, but any number of users from any number of sites may participate in the interactive program. Each site 820, 830, and 840 has a video camera 822, 832, and 842 which takes simultaneous color and/or depth images of a user at that location. If more than one user is at the same site, a video camera dedicated to each user at the site should be available. All the users at the same site may share a display 824, 834, and 844 or have their own individual displays. However, all the displays are capable of showing images of all the users at the different sites participating in the same virtual environment.

The images obtained by the video cameras 822, 832, and 842 from the different sites 820, 830, and 840 are first interpreted locally by the corresponding local processor 826, 836, 846. Then the data representing the user's moves are sent over the network to the master processor and/or the other processors servicing other players of the game. Each of the processors can use gesture classification, collision boxes, and/or any other technique to interpret the user's moves.

The display 824, 834, 844 displays data from the local processor 826, 836, 846 as well as data from other processors. The data from the local processor provides information about the local user's movements and the data from the other processors provide information about other players' movements.

Figure 9:
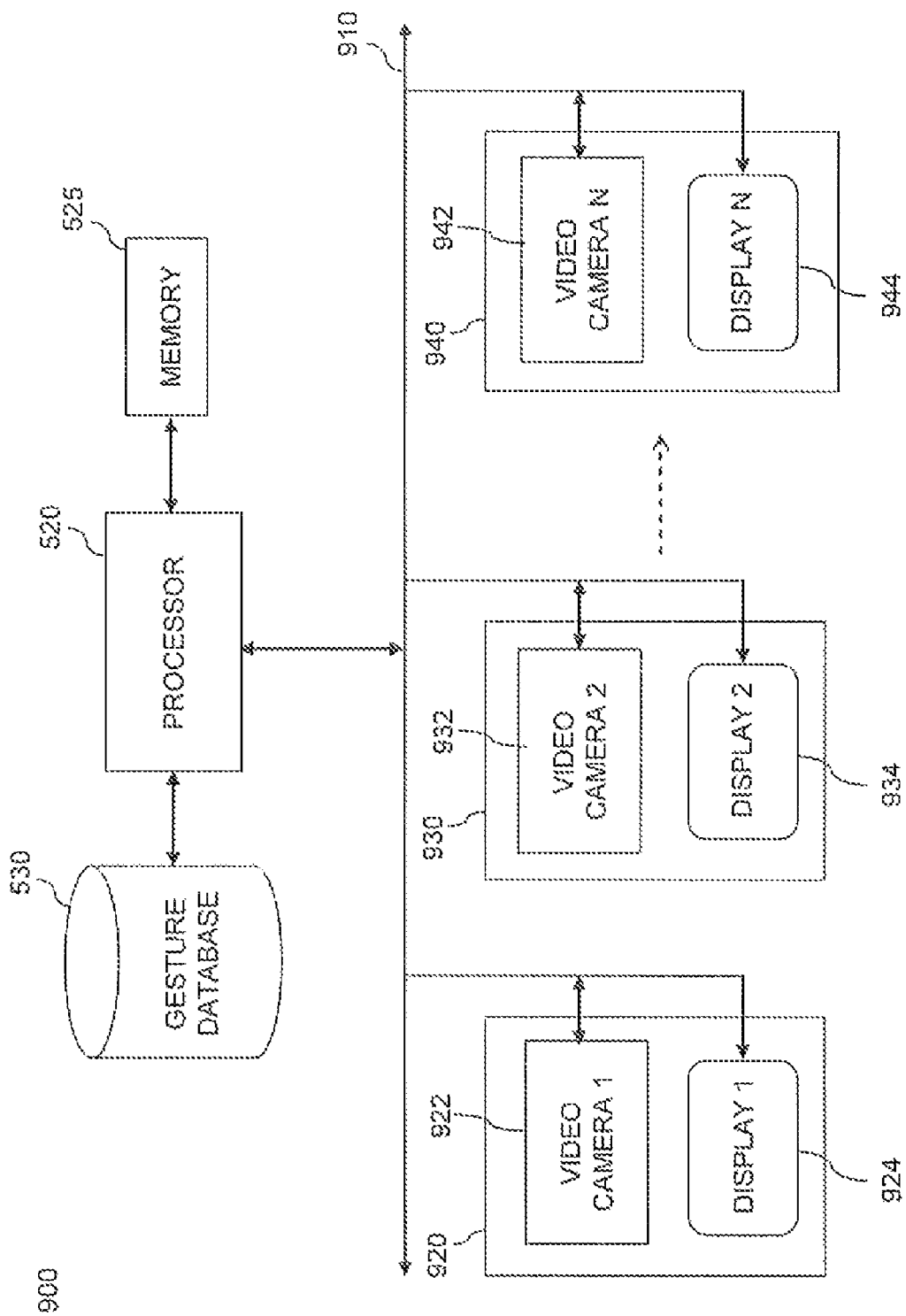
FIG. 9 shows a block diagram of one embodiment of a multi-player interactive training system.

FIG. 9 shows a block diagram 900 of one embodiment of the interactive training system 900 accessible by multiple players over a network. Multiple players may access the same interactive program run by a master processor/server 520 from different locations. Similar to FIG. 8, FIG. 9 shows three separate sites 920, 930, and 940 from which users access the same virtual environment, but any number of users from any number of sites may participate in the interactive program. Each site 920, 930, and 940 has a video camera 922, 932, and 942 which takes simultaneous color and/or depth images of a user at that location. If more than one user is at the same site, a video camera dedicated to each user at the site should be available. All the users at the same site may share a display 924, 934, and 944 or have their own individual displays. However, all the displays are capable of showing images of all the users at the different sites participating in the same virtual environment.

The images obtained by the video cameras 922, 932, and 942 from the different sites 920, 930, and 940 are sent over a network 910 to the processor 520. The processor 520, memory 525, and gesture database 530 function in the same manner as described above with respect to FIG. 5, but with multiple users participating in the same interactive program, the processor 520 must process the images captured for each user. Alternatively, the processor 520 may have sub-processors dedicated to individual users, and each sub-processor may access an independent memory within the memory 525. It will be apparent to a person skilled in the art that different hardware structures may implement the functions of the processor 520 and the memory 525 to optimize the response time.

The processor 520 also runs the interactive program which the users experience virtually through the displays 924, 934, and 944. The images of all the users are incorporated into the virtual environment of the interactive program and is presented by each display 924, 934, and 944. Signals are sent by the processor 520 to the displays 924, 934, and 944 along the network 910.

In one embodiment of a multi-player exergame, two or more players can compete to be the first one to finish an obstacle course. The local display devices can show both the avatar of the local player as well as the avatars of other participating players progressing in the virtual environment. In one embodiment, the displays 824, 834, 844 can show a split screen with two or more sections. For example, one of the sections can show the local user, and another section can show the current leader in the obstacle course race.

In one embodiment of a multi-player exergame, two players can be the participants in a boxing match. The local displays can show the avatars of both players, and the prompts to the players can be different. The interactive program can determine an advantageous move for each player and provide the prompts for those moves.

The display device of the interactive fitness training program can be used an advertisement medium to provide product placement or advertisements for sponsors. For example, a sporting goods manufacturer, such as Nike or adidas, may choose to pay an advertising fee to place a logo or video advertisement on the screen, either within or adjacent to the virtual environment of the training program, while the user is using the program. In one embodiment, if a user achieves a goal, such as reaching a fitness objective or finishing a section of the program, a reward screen congratulating the user can pop up on the display device along with the sponsor's message or advertisement.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this patent application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

I claim:

1. A system for providing an interactive training program, comprising:
a sensor configured to capture depth images of user movements without using markers on the user;
a processor configured to:
generate a virtual environment,
generate a prompt for a user to perform a movement,
determine from the depth images three-dimensional coordinates for each of a plurality of feature points on the user's body;
interpret user movements, wherein interpreting user movements comprises: calculating a similarity measure between user movements and catalogued movements in a database using the determined three-dimensional coordinates of the plurality of feature points to identify the user movements, and monitoring user movements using collision boxes in the virtual environment,
analyze the user movements and physiological responses of the user to generate quantitative data describing the user movements, wherein physiological responses include heart rate or respiration rate, generate a report of user's performance based on the analysis and monitoring, and create a customized program for the user based on the analysis and monitoring or based on a user-specified objective;

a display device configured to show the virtual environment, and the prompt to perform the movement;

a training apparatus configured to measure the physiological responses of the user;

a transmitter configured to transmit the report to a personal trainer;

a first memory configured to store the images of the user movements; and a second memory configured to store the analysis and reports.

2. The system of claim 1 wherein the display device is configured to show an advertisement from a sponsor while the interactive training program is running.

3. The system of claim 1 wherein the sensor is a depth camera.

4. The system of claim 1 wherein the report includes a comparison of the user's performance in a current training session with the user's performance during previous sessions or with the user's target goals.

5. The system of claim 1, wherein the movement is a physical therapy movement.

6. The system of claim 1, wherein the movement is a fitness movement.

7. The system of claim 1, wherein the processor is further configured to represent the user as an avatar in the virtual environment, wherein performance by the user of the movement progresses the avatar in the virtual environment, and further wherein user movements are substantially mimicked by the avatar.

8. The system of claim 7 wherein interpreting the user movements further comprises tracking the user movements and substantially imposing the user movements on the avatar.

9. The system of claim 7 wherein the processor is further configured to provide feedback to the user by advancing the avatar through the virtual environment when the user successfully performs the movement and moving the avatar backwards through the virtual environment when the user fails to perform the movement.

10. A system for providing an interactive training program, comprising:

a display device for displaying a virtual environment, and a prompt to perform a movement;

means for capturing depth images of user movements, wherein the means for capturing depth images does not use markers on the user;

means for determining from the depth images three-dimensional coordinates for each of a plurality of feature points on the user's body;

means for storing movements for detecting and performing gesture recognition on the user movements; and means for interpreting the user movements based at least upon the stored movements and the determined three-dimensional coordinates of the plurality of feature points.

11. The system of claim 10, wherein the movement is a physical therapy movement.

12. The system of claim 10, wherein the display device further displays an avatar representing the user, wherein performance by the user of the movement progresses the avatar in the virtual environment.

13. A system for providing an interactive training program, comprising:

a sensor configured to capture depth images of user movements without using markers on the user; and a processor configured to:

generate a virtual environment;

generate a prompt for a user to perform a movement;

determine from the depth images three-dimensional coordinates for each of a plurality of feature points on the user's body;

interpret user movements using the determined three-dimensional coordinates of the plurality of feature points;

analyze the user movements to generate quantitative data describing the user movements;

generate a report of user's performance based on the analysis of the user's movements; and cause to display the virtual environment, and the prompt to perform the movement.

14. The system of claim 13, wherein the movement is a fitness movement.

15. The system of claim 13, wherein the movement is a sports movement.

16. The system of claim 13, further comprising a database including at least catalogued movements, wherein interpreting the user movements comprises calculating a similarity measure between the user movements and each of the catalogued movements in the database to identify the user movements.

17. The system of claim 13, further comprising a transmitter configured to transmit the report to a personal trainer.

18. The system of claim 13, wherein the processor creates a customized training program for the user based on the analysis of the user movements.

19. The system of claim 13, further comprising a training apparatus configured to measure physiological responses of the user during the interactive training program, wherein the processor is further configured to analyze the physiological responses with the user movements, generate a report of the user's performance based on the analysis, and create a customized training program for the user based on the analysis of the physiological responses with the user movements.

20. The system of claim 13, wherein the display is configured to show an advertisement from a sponsor while the interactive training program is running.

21. The system of claim 13 wherein the sensor is a depth camera.

22. The system of claim 13 wherein the report includes a comparison of the user's performance in a current session training session with the user's performance during previous sessions or with the user's target goals.

23. The system of claim 13, wherein the movement is a physical therapy movement.

24. The system of claim 13, wherein the processor is further configured to represent the user as an avatar in the virtual environment, wherein performance by the user of the movement progresses the avatar in the virtual environment, and further wherein user movements are substantially mimicked by the avatar.

25. The system of claim 24, wherein interpreting the user movements comprises tracking the user movements, substantially imposing the user movements on the avatar, and using one or more collision boxes in the virtual environment to monitor the user movements.

26. The system of claim 24 wherein the processor is further configured to provide feedback to the user by advancing the avatar through the virtual environment when the user successfully performs the fitness movement and moving the avatar backwards through the virtual environment when the user fails to perform the fitness movement.

27. A non-transitory computer-readable medium encoded with processing instructions for implementing a method performed by a computer, the method comprising:
    generating a virtual environment;
    generating a prompt for a user to perform a movement;
    determining from a plurality of depth images of the user three-dimensional coordinates for each of a plurality of feature points on the user's body;
    interpreting user movements using the determined three-dimensional coordinates of the plurality of feature points;
    analyzing the user movements to generate quantitative data describing the user movements; and
    causing to display the virtual environment and the prompt to perform the movement.

* * * * *